US010748186B2

(12) United States Patent
Stekkelpak et al.

(10) Patent No.: US 10,748,186 B2
(45) Date of Patent: *Aug. 18, 2020

(54) PROVIDING A MODIFIED CONTENT ITEM TO A USER

(71) Applicant: Google LLC, Mountain View, CA (US)

(72) Inventors: Zoltan Stekkelpak, Mountain View, CA (US); Artem Chetverykov, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 15/898,535

(22) Filed: Feb. 17, 2018

(65) Prior Publication Data

US 2018/0174187 A1 Jun. 21, 2018

Related U.S. Application Data

(63) Continuation of application No. 14/938,347, filed on Nov. 11, 2015, now Pat. No. 9,898,758, which is a continuation of application No. 13/495,768, filed on Jun. 13, 2012, now Pat. No. 9,213,769.

(51) Int. Cl.
*G06Q 30/02* (2012.01)
*G06F 16/9535* (2019.01)

(52) U.S. Cl.
CPC ..... *G06Q 30/0256* (2013.01); *G06F 16/9535* (2019.01); *G06Q 30/0277* (2013.01)

(58) Field of Classification Search
CPC ........... G06F 17/30902; G06F 3/04847; G06F 17/3064; G06F 17/30861; G06F 16/9535; G06F 3/04842; G06F 16/23; G06F 16/738; G06F 3/165; G06F 16/903; G06F 3/0482; G06F 3/04817; G06F 8/71; G06F 40/197; G05B 2219/32128; G05B 2219/31472; G06Q 13/02
See application file for complete search history.

(56) References Cited

U.S. PATENT DOCUMENTS

| 6,772,208 B1 | 8/2004 | Dutta |
| 2005/0240580 A1 | 10/2005 | Zamir et al. |
| 2006/0206454 A1* | 9/2006 | Forstall ................. G06F 16/951 707/999.003 |
| 2006/0224624 A1 | 10/2006 | Korn et al. |
| 2008/0109306 A1 | 5/2008 | Maigret et al. |
| 2009/0063461 A1 | 3/2009 | Wang et al. |
| 2010/0050078 A1 | 2/2010 | Refuah et al. |

(Continued)

FOREIGN PATENT DOCUMENTS

| KR | 1020070093135 | 9/2007 |
| WO | WO-2011/030131 | 3/2011 |

OTHER PUBLICATIONS

"Walmart and Google to offer voice-enabled shopping", BBC News, Aug. 23, 2017 (10 pages).

(Continued)

*Primary Examiner* — Yuk Ting Choi
(74) *Attorney, Agent, or Firm* — Foley & Lardner LLP; James De Vellis

(57) ABSTRACT

Methods and systems for generating a content item associated with search results and, based on a subsequent return to the search results, providing the content item in a modified manner.

20 Claims, 7 Drawing Sheets

(56) References Cited

U.S. PATENT DOCUMENTS

| | | |
|---|---|---|
| 2010/0100417 A1 | 4/2010 | Nussel et al. |
| 2010/0161590 A1 | 6/2010 | Zheng et al. |
| 2011/0191163 A1 | 8/2011 | Allaire et al. |
| 2012/0253899 A1 | 10/2012 | Qin et al. |
| 2013/0010643 A1 | 1/2013 | Yu |
| 2013/0110643 A1* | 5/2013 | Goyal ............... G06Q 30/02 705/14.68 |
| 2013/0282683 A1* | 10/2013 | Kohavi ............. G06F 16/954 707/706 |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0358301 A1 | 12/2017 | Raitio et al. |

OTHER PUBLICATIONS

Abrams, Help users find, interact & re-engage with your app on the Google Assistant, Google Developers Blog, Nov. 15, 2017, 16 pages.

Albrecht, "Alexa, How Can You Be Used in Restaurants?", the spoon, Dec. 10, 2017, 6 pages.

Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).

Barr, "AWS DeepLens—Get Hands-On Experience with Deep Learning With Our New Video Camera", AWS News Blog, Nov. 29, 2017, 11 pages.

Broussard, Mitchel, "Chatbot-Like Siri Patent Includes Intelligent Image, Video, and Audio Recognition within Messages", MacRumors, May 11, 2017 (7 pages).

Buckland et al., "Amazon's Alexa Takes Open-Source Route to Beat Google Into Cars", Bloomberg, Feb. 27, 2018, 6 pages.

Chen, Lulu Yilun, "Alibaba Challenges Google, Amazon With New Echo-Like Device", Bloomberg Technology, Jul. 5, 2017 (3 pages).

Clover, Juli, "Amazon and Google Want to Turn Their Smart Home Speakers Into Telephone Replacements", MacRumors, Feb. 15, 2017 (5 pages).

Coberly, "Apple patent filing reveals potential whispering Siri functionality", Techspot, Dec. 14, 2017, 4 pages.

Collins, et al., "Can Twitter Save Itself?", cnet, Apr. 26, 2017, reprinted from https://www.cnet.com/news/twitter-q1-2017-earnings/ on Aug. 22, 2017 (2 pages).

Crist, Ry, "Logitech Harmony's Alexa Skill just got a whole lot better", cnet, Jul. 13, 2017 (2 pages).

Estes, "Amazon's Newest Gadget Is a Tablet That's Also an Echo", Gizmodo, Sep. 19, 2017, 3 pages.

Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.

Forrest, Conner, "Essential Home wants to be bridge between Amazon's Alexa, Apple's Siri, and Google Assistant", TechRepublic, May 31, 2017 (10 pages).

Foxx, Chris, "Apple reveals HomePod smart speaker", BBC News, Jun. 5, 2017 (6 pages).

Gebhart, Andrew, "Google Assistant is spreading, but it needs its own Echo Dot", cnet, May 20, 2017 (7 pages).

Gebhart, Andrew, "Google Home to the Amazon Echo: 'Anything you can do . . . '", cnet, May 18, 2017 (7 pages).

Gibbs, Samuel, "Your Facebook Messenger app is about to be filled with ads", The Guardian, Jul. 12, 2017 (3 pages).

Golgowski, Nina, "This Burger King Ad Is Trying to Control Your Google Home Device", Huffpost, Apr. 12, 2017 (7 pages).

Google Developers, "GoogleAssistant SDK" reprinted from https://developers.google.com/assistant/sdk on Aug. 22, 2017 (4 pages).

Google Inc., Products Feed Specification, printed from Internet address: http://www.support.google.com/merchants/bin/answer.py?hl=en&answer=188494#US, on Mar. 18, 2013, 6 pages.

Google Inc., Supported File Formats, printed from Internet address: http://www.support.google.com/merchants/bin/answer.py?hl=en&answer=160567, on Mar. 18, 2013, 1 page.

Gurman, et al., "Apple Is Manufacturing a Siri Speaker to Outdo Google and Amazon", Bloomberg, May 31, 2017 (5 pages).

Hardwick, Tim, "Facebook Smart Speaker Coming Next Year With 15-inch Touch Panel", MacRumors, Jul. 25, 2017 (5 pages).

Heater, "Amazon Alexa devices can finally tell voices apart", TechCrunch, Oct. 11, 2017, 6 pages.

International Preliminary Report on Patentability for PCT Appl. Ser. No. PCT/US2013/034362 dated Dec. 24, 2014. 7 pages.

International Search Report and Written Opinion for PCT/US2013/034362, dated Jul. 1, 2013, 10 pages.

Johnston, "Amazon Whirlwind: New Echo, Plus, Spot, Connect, Fire TV Take the Stage", Twice, Sep. 27, 2017, 4 pages.

Kelion, "Amazon revamps Echo smart speaker family", BBC News, Sep. 27, 2017, 11 pages.

Kelion, Leo, "Amazon's race to make Alexa smarter", BBC News, Jul. 28, 2017 (8 pages).

Koetsier, John, "Ads on Amazon Echo: Wendy's, ESPN, and Progressive Among Brands Testing", Forbes, May 11, 2017 (2 pages).

Krishna, "Jim Beam's smart decanter will pour you a shot when you ask", engadget, Nov. 29, 2017, 3 pages.

Lacy, "Improving search and advertising are the next frontiers for voice-activated devices", TechCrunch, Dec. 20, 2017, 13 pages.

Larson, Selena, "Google Home now recognizes your individual voice", CNN Money, San Francisco, California, Apr. 20, 2017 (3 pages).

Lee, Take Two for Samsung's troubled Bixby assistant, BBC News, Oct. 19, 2017, 6 pages.

Lee, Dave, "The five big announcements from Google I/O", BBC News, May 18, 2017 (9 pages).

Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.

Nieva, Richard, "Google Home and eBay can tell you how much that's worth", cnet, Mar. 8, 2017 (3 pages).

Novet, et al., "Amazon is getting ready to bring Alexa to work", CNBC, Nov. 29, 2017, 4 pages.

Palladino, "Garmin teamed up with Amazon to make a tiny Echo Dot for your car", ars Technica, Oct. 17, 2017, 2 pages.

Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).

Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).

Perez, "Alexa's 'Routines' will combine smart home control with other actions, like delivering your news and weather", TechCrunch, Sep. 28, 2017, 10 pages.

Perez, Sarah, "The first ad network for Alexa Skills shuts down following Amazon's policy changes", Tech Crunch, Jun. 15, 2017 (6 pages).

Porter, Jon, "Amazon Echo Show release date, price, news and features", Techradar, Jun. 26, 2017 (14 pages).

Pringle, "'I'm sorry to hear that': Why training Siri to be a therapist won't be easy", CBC News, Sep. 24, 2017, 3 pages.

Purcher, Jack, Today Google Home's Virtual Assistant can learn its Owner's voice for Security Reasons like Apple's Patent Pending Idea, Apr. 20, 2017, 4 pages.

Sablich, Justin, "Planning a Trip With the Help of Google Home", New York Times, May 31, 2017 (6 pages).

Seifert, Dan, "Samsung's new virtual assistant will make using your phone easier", The Verge, Mar. 20, 2017 (6 pages).

(56) References Cited

OTHER PUBLICATIONS

Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Unknown Author, "'Dolphin' attacks fool Amazon, Google voice assistants", BBC News, Sep. 7, 2017, 8 pages.
U.S. Notice of Allowance for U.S. Appl. No. 13/495,768 dated Aug. 26, 2015. 13 pages.
U.S. Notice of Allowance for U.S. Appl. No. 14/938,347 dated Oct. 6, 2017. 8 pages.
U.S. Office Action for U.S. Appl. No. 13/495,768 dated Feb. 5, 2015. 14 pages.
U.S. Office Action for U.S. Appl. No. 13,495,768 dated Sep. 16, 2014. 14 pages.
U.S. Office Action for U.S. Appl. No. 13/495,768 dated Jan. 9, 2014. 10 pages.
U.S. Office Action for U.S. Appl. No. 13/495,768 dated May 15, 2014. 16 pages.
U.S. Office Action for U.S. Appl. No. 14/938,347 dated Aug. 29, 2016. 19 pages.
U.S. Office Action for U.S. Appl. No. 14/938,347 dated Dec. 12, 2016. 23 pages.
U.S. Office Action for U.S. Appl. No. 14/938,347 dated Mar. 28, 2017. 19 pages.
Willens, Max, "For publishers, Amazon Alexa holds promise but not much money (yet)", Digiday, Jul. 6, 2017 (6 pages).

* cited by examiner

US 10,748,186 B2

PROVIDING A MODIFIED CONTENT ITEM TO A USER

CROSS REFERENCE TO RELATED APPLICATIONS

This application claims the benefit of and priority under 35 U.S.C. § 120 as a continuation of U.S. patent application Ser. No. 14/938,347, filed Nov. 11, 2015, titled "Providing a Modified Content Item to a User," now U.S. Pat. No. 9,898,758, which is a continuation of U.S. patent application Ser. No. 13/495,768, filed Jun. 13, 2012, titled "Providing a Modified Content Item to a User," now U.S. Patent No. 9,213,769, the contents of each of which are incorporated herein by reference in their entirety.

BACKGROUND

The present disclosure relates generally to systems and methods for providing a modified content item to a user and more particularly, to providing a modified content item to a user based on a subsequent return to a set of search results.

SUMMARY

In one implementation, in general, a computer-implemented method includes receiving, at a server, a search query. The method may also include providing a web page comprising a set of search results selected based on the query and comprising the content item for display on the web page along with the search results, wherein the content item is selected based on the search query. The method may yet further include receiving an indication of a user interaction with the content item. The method may also include, based on a subsequent return to the web page comprising the search results and the content item, providing the content item in a modified manner.

In another implementation, in general, a system may include a computer-readable storage device comprising instructions; and one or more processors coupled to the tangible computer-readable storage device and configured to execute the instructions to perform operations. The operations may include receiving a search query. The operations may also include identifying a set of search results responsive to the query during a search session. The operations may include providing at least one content item based on the set of search results. The operations may also include receiving an interaction with the content item. The operations may include, based on a subsequent return to the search results, providing the content item in a modified manner.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

The disclosure herein provides various methods and systems for providing relevant content (e.g., advertisements) to a user, such as providing the relevant content on a search results web page.

In some implementations, content that appears on a search results web page does not change. For example, the same content is shown to the first-time visitor as well as to a repeat visitor. There is no distinction of the user with relation to the content.

In an example, a user may provide a search query on a search engine. For example, the user could search for "used car". The search results for "used car" may also include content along with the web page. The user may retrieve the content instead of the search results. For example, the user may click on a sponsored link such as "Used car model A for sale; visit www.example.com for details", which takes the user to the web page for the used car model A.

The user may want to compare the offer on www.example.com to other offers that had previously appeared along with the search results. The user may click the browser's back button to return to the search results. The sponsored link, "Used car model A for sale; visit www.example.com for details," may remain the same in some implementations.

In some implementations, content that appears on a search results web page may be dynamic. For example, the content may vary depending on whether it is a first time visitor, repeat visitor, etc.

The system and method described herein is a feature that allows different content to be displayed depending on the user. In an implementation, different content will be displayed to a user who has returned to the original search results from a web page than to the same user who is originally viewing the search results.

For example, a user searches for a "used car" using a search engine, clicks on the sponsored link "Used car model A for sale; visit www.example.com for details", and then returns to the search result page. Here, the user will note that the sponsored link changes. The sponsored link may now read "Used car model A for sale; visit www.example.com for savings of $500 if purchased within the next 36 hours." In this example, the text "for savings of $500 if purchased within the next 36 hours" is now also displayed to the user.

The content and changed content may be managed by a content provider's (e.g., an advertiser's) online account. The interface may include the option of creating the changed content text. Also, the interface may include various ways to distinguish the content from other content when the user returns to the search results, e.g., highlighting, color, shadowing, fading effect, etc.

Figure 1:
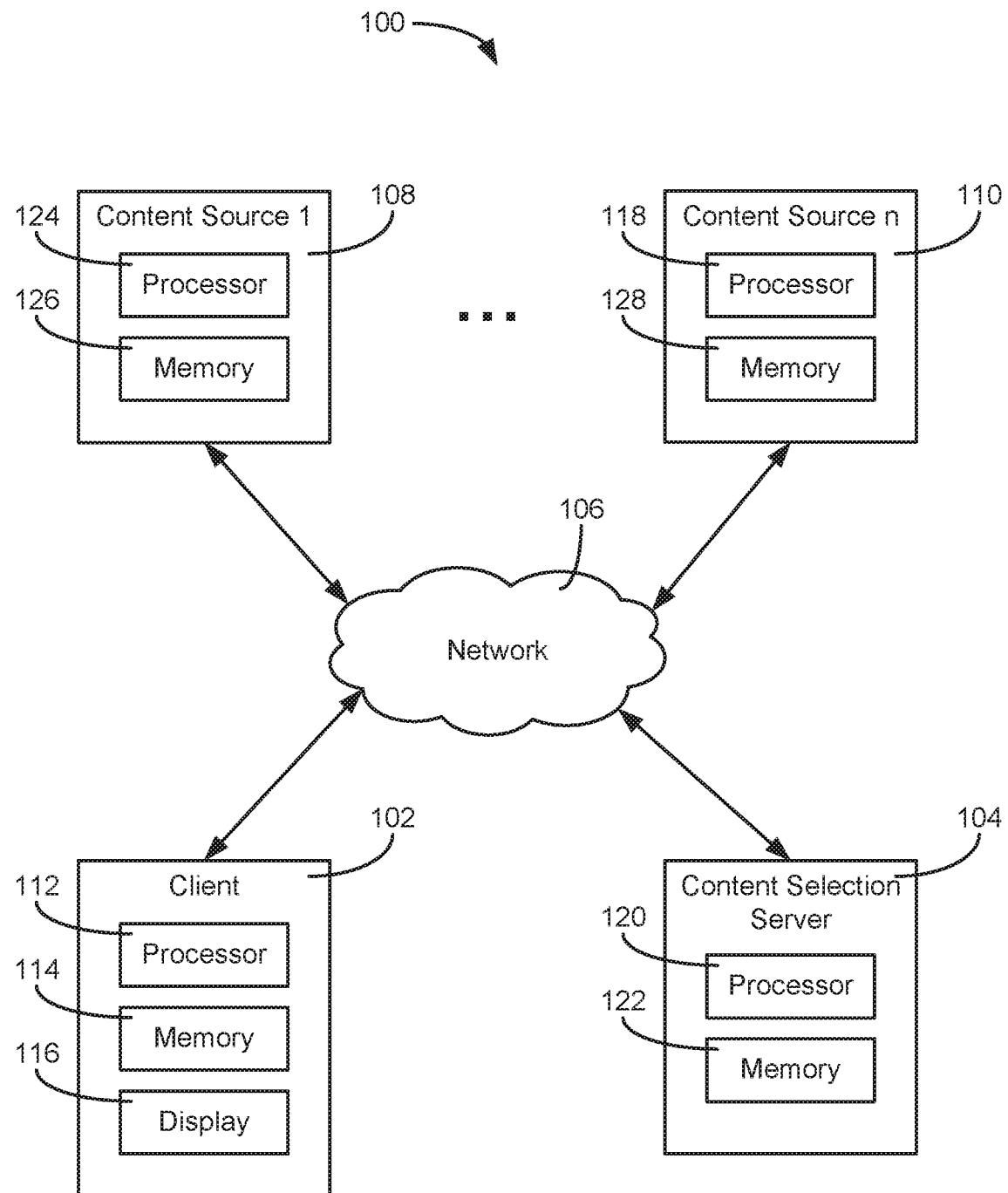
FIG. 1 is an example of a block diagram of a computer system in accordance with a described implementation.

FIG. 1 is a block diagram of a computer system 100 in accordance with a described implementation. System 100 includes client 102, which may communicate with other computing devices via a network 106. For example, client 102 may communicate with one or more content sources ranging from a first content source 108 up to an nth content source 110. Content sources 108, 110 may provide webpages and/or media content (e.g., audio, video, and other forms of digital content) to client 102. System 100 may include a content selection server 104, which provides advertisement data to other computing devices over network 106.

Network 106 may be any form of computer network that relays information between client 102, content selection server 104, and content sources 108, 110. For example, network 106 may include the Internet and/or other types of data networks, such as a local area network (LAN), a wide area network (WAN), a cellular network, satellite network, or other types of data networks. Network 106 may include any number of computing devices (e.g., computer, servers, routers, network switches, etc.) that are configured to receive and/or transmit data within network 106. Network 106 may include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different user electronic devices configured to communicate via network 106 (e.g., a laptop computer, a desktop computer, a tablet computer, a smartphone, a digital video recorder, a set-top box for a television, a video game console, etc.). Client 102 is shown to include a processor 112 and a memory 114, i.e., a processing circuit. Memory 114 stores machine instructions that, when executed by processor 112, cause processor 112 to perform one or more of the operations described herein. Processor 112 may include a microprocessor, application-specific integrated circuit (ASIC), field-programmable gate array (FPGA), etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which processor 112 can read instructions. The instructions may include code from any suitable computer-programming language such as, but not limited to, C, C++, C#, Java, JavaScript, Perl, Python and Visual Basic.

Client 102 may include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays webpages using webpage data received from content sources 108, 110 and/or from content selection server 104.

Content sources 108, 110 are electronic devices connected to network 106 and provide media content to client 102. For example, content sources 108, 110 may be computer servers (e.g., FTP servers, file sharing servers, web servers, etc.) or other devices that include a processing circuit. Media content may include, but is not limited to, webpage data, a movie, a sound file, pictures, and other forms of data. Similarly, content selection server 104 may include a processing circuit including a processor 120 and a memory 122. In some implementations, content selection server 104 may include several computing devices (e.g., a data center, a network of servers, etc.). In such a case, the various devices of content selection server 104 may comprise a processing circuit (e.g., processor 120 represents the collective processors of the devices and memory 122 represents the collective memories of the devices).

Content selection server 104 may provide digital advertisements to client 102 via network 106. For example, content source 108 may provide a webpage to client 102, in response to receiving a request for a webpage from client 102. In some implementations, an advertisement from content selection server 104 may be provided to client 102 indirectly. For example, content source 108 may receive advertisement data from content selection server 104 and use the advertisement as part of the webpage data provided to client 102. In other implementations, an advertisement from content selection server 104 may be provided to client 102 directly. For example, content source 108 may provide webpage data to client 102 that includes a command to retrieve an advertisement from content selection server 104. On receipt of the webpage data, client 102 may retrieve an advertisement from content selection server 104 based on the command and display the advertisement when the webpage is rendered on display 116.

According to various implementations, a user of client 102 may search for, access, etc., various documents (e.g., web pages, web sites, articles, images, video, etc.) using a search engine via network 106. The web pages may be displayed as a search result from a search engine query containing search terms or keywords. Search engine queries may allow the user to enter a search term or keyword into the search engine to execute a document search. Search engines may be stored in memory 122 of server 104 and may be accessible with client 102. The result of an executed website search on a search engine may include a display on a search engine document of links to websites. Executed search engine queries may result in the display of advertising data generated and transmitted from server 104. In some cases, search engines contract with advertisers to display advertising to users of the search engine in response to certain search engine queries.

In another implementation, content providers (e.g., advertisers) may purchase or bid on the search terms such as keyword entries entered by users into a document such as a search engine. When the search term or keyword are entered into the document, then advertising data such as links to an advertiser website may be displayed to the user. In some implementations, server 104 may use an auction model that generates an advertisement. Content providers may bid on keywords using the auction model. The auction model may also be adjusted to reflect the maximum amount an advertiser is willing to spend so that a user is exposed to an advertisement a minimum number of times.

A user may opt in or out of allowing content selection server 104 or other content source to identify and store information about the user and/or about devices operated by the user. For example, the user may opt in to receiving content from content selection server 104 that may be more relevant to her. In one implementation, the user may be represented as a randomized device identifier (e.g., a cookie, a device serial number, etc.) that contains no personally-identifiable information about the user. For example, information relating to the user's name, demographics, etc., may not be used by an content selection server unless the user opts in to providing such information. Thus, the user may have control over how information is collected about him or her and used by an content selection server or other content source.

In some implementations, the device identifier is associated with a particular instance of a client application (e.g., running on client device 102). In some implementations, the device identifier is associated with a user (e.g., when the user logs in with a username and password). Some information that may be associated with the user may include events, such as one or more queries, one or more clicks, browser history data (e.g., the URLs visited, the number of URLs viewed, URL visit durations, etc.), etc. Events may also include advertising metrics, such as impressions, click through rate, etc. for each user. For example, the device identifier may include a time stamp associated with a particular event. Events may also include how many times a user is exposed to a particular ad, a campaign, etc.

Content source 108, 110 may select content to be provided with a webpage based on the device identifier for a user visiting the web page. For example, a user may opt in to receiving relevant advertisements from an content selection server. Rather than selecting an advertisement to be provided on the web page based on the content of the web page itself or on other factors, content selection server 104 may take into account the device identifier provided as part of the content request. In one example, a user may visit a number of webpages devoted to reviews of golf clubs and later visit a webpage to check stock quotes. Based on the user's visits to the golf-related webpages, the user may be determined to be interested in receiving advertisements for golf clubs. When the user later visits the webpage to check stock quotes, an online retailer of golf equipment may seek to include an advertisement on the webpage for that particular user, even though the financial webpage is unrelated to golf.

If content is selected based in part on a device identifier for a user that opts in to receiving more relevant content, a content provider may specify that certain content is to be provided to a set of device identifiers. For example, an advertiser may identify a set of device identifiers associated with visiting the advertiser's website and making a purchase. Such users may later wish to know if the advertiser is running a sale. In some cases, an advertising network may identify users on behalf of the advertiser that may be interested in receiving advertisements from the advertiser. For example, advertisers may specify a number of topic categories for their advertisements and the advertising network may match users' interests to the categories, to provide relevant advertisements to the users.

Figure 2:
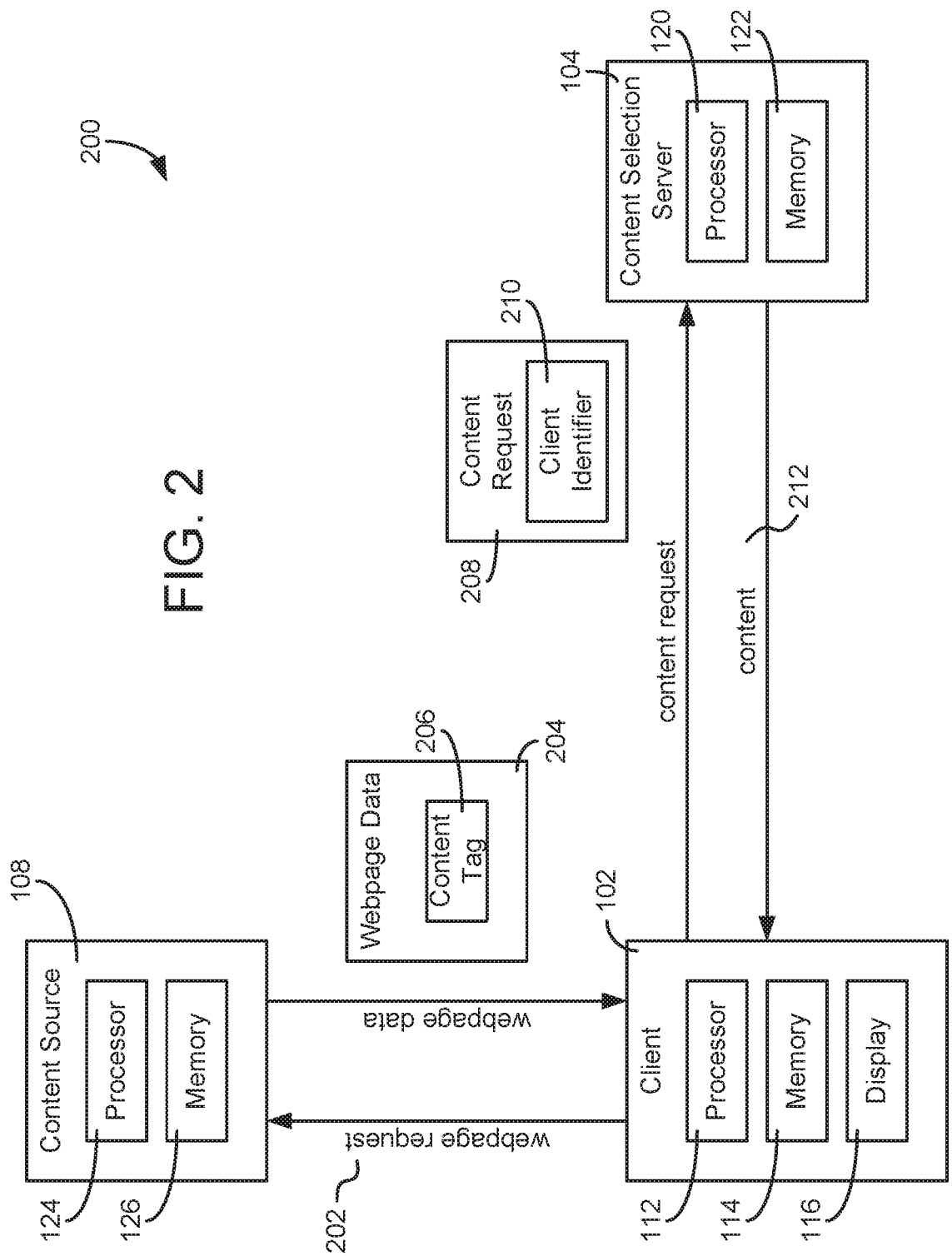
FIG. 2 is an illustration of an example system in accordance with a described implementation.

FIG. 2 is an example illustration of content 212 being selected by content selection server 104. As shown, client 102 may send a webpage request 202 to a content source via network 106, such as content source 108. For example, webpage request 202 may be a request that conforms to the hypertext transfer protocol (HTTP), such as the following:

GET/weather.html HTTP/1.1

Host: www.example.org

Such a request may include the name of the file to be retrieved, weather.html, as well as the network location of the file, www.example.org. In some cases, a network location may be an IP address or may be a domain name that resolves to an IP address of content source 108. In some implementations, a client identifier, such as a cookie associated with content source 108, may be included with webpage request 202 to identify client 102 to content source 108.

In response to receiving webpage request 202, content source 108 may return webpage data 204, such as the requested file, "weather.html." Webpage data 204 may be configured to cause client 102 to display a webpage on electronic display 116 when opened by a web browser application. In some cases, webpage data 204 may include code that causes client 102 to request additional files to be used as part of the displayed webpage. For example, webpage data 204 may include an HTML image tag of the form:

<img src="Monday_forecast.jpg">

Such code may cause client 102 to request the image file "Monday_forecast.jpg," from content source 108.

In some implementations, webpage data 204 may include content tag 206 configured to cause client 102 to retrieve an advertisement from content selection server 104. In some cases, content tag 206 may be an HTML image tag that includes the network location of content selection server 104. In other cases, content tag 206 may be implemented using a client-side scripting language, such as JavaScript. For example, content tag 206 may be of the form:

<script type='text/javascript'>

AdNetwork_RetrieveAd("argument")

</script>

Where AdNetwork_RetrieveAd is a script function that causes client 102 to send an content request 208 to content selection server 104. In some cases, the argument of the script function may include the network address of content selection server 104, the referring webpage, and/or additional information that may be used by content selection server 104 to select content to be included with the webpage.

Content request 208 may include a client identifier 210, used by content selection server 104 to identify client 102. In various implementations, client identifier 210 may be an HTTP cookie previously set by content selection server 104 on client 102, the IP address of client 102, a unique device serial for client 102, other forms of identification information, or combinations thereof. For example, content selection server 104 may set a cookie that includes a unique string of characters on client 102 when content is first requested by client 102 from content selection server 104. Such a cookie may be included in subsequent content requests sent to content selection server 104 by client 102.

In some implementations, client identifier 210 may be used by content selection server 104 to store history data for client 102, with the permission of the user of client 102. For example, content request 208 may include data relating to which webpage was requested by client 102, when the webpage was requested, and/or other history data. Whenever client 102 visits a webpage participating in the content network, i.e., a webpage that includes an advertisement or other content selected by content selection server 104, content selection server 104 may receive and store history data for client 102. In this way, content selection server 104 is able to reconstruct the online history of client 102 regarding webpages in the content network. In some implementations, content selection server 104 may also receive history data for client 102 from entities outside of the content network. For example, a website that does not use content selected by content selection server 104 may nonetheless provide information about client 102 visiting the website to content selection server 104, with the user's permission.

In some cases, client identifier 210 may be sent to content selection server 104 when the user of client 102 performs a particular type of online action. For example, webpage data 204 may include a tag that causes client 102 to send client identifier 210 to content selection server 104 when the a displayed advertisement is selected by the user of client 102. Client identifier 210 may also be used to record information after client 102 is redirected to another webpage. For example, client 102 may be redirected to an advertiser's website if the user selects a displayed advertisement. In such a case, client identifier 210 may also be used to record which actions were performed on the advertiser's website. For example, client identifier 210 may also be sent to content selection server 104 as the user of client 102 navigates the advertiser's website. In this way, data regarding whether the user searched for a product, added a product to a shopping cart, completed a purchase on the advertiser's website, etc., may also be recorded by content selection server 104. In some implementations, content selection server 104 may use the data regarding users' online actions to calculate performance metrics for a webpage (e.g., a conversion rate, a click-through rate, etc.).

In response to receiving content request 208, content selection server 104 may select content 312 to be returned to client 102 and displayed on display 116. For example, content selection server 104 may select content 212 based on client identifier 210 and/or on a user identifier associated with client identifier 210. In one implementation, content selection server 104 may determine whether client identifier 210 corresponds to a similar user identifier as that of one or more other user identifiers. For example, content selection server 104 may determine whether a client identifier for client 102 is associated with characteristics that are similar to that of one or more other user identifiers specified by an advertiser. Content selection server 104 may analyze history data for the one or more user identifiers specified by the advertiser to identify characteristics of the user identifiers. The characteristics may be compared to those of the user identifier associated with client 102 to determine its similarity. In some implementations, content selection server 104 may determine a similarity score to represent how similar the characteristics of the user identifier is to that of the user identifiers specified by the advertiser.

In some implementations, content selection server 104 may use characteristics of the one or more user identifiers specified by an advertiser or other content source to train a behavioral model. For example, a large number of user identifiers associated with online purchases of insurance may have recently visited a webpage that compares rates among different insurance carriers. Such a characteristic may be used in a behavioral model by content selection server 104 to identify other user identifiers of users that may also be interested in purchasing insurance. In some implementations, the behavioral model may be constructed by representing a user identifier as a set of feature vectors. In general, a feature vector refers to an n-dimensional vector of characteristics of a user identifier, such as information about online actions associated with the user identifier. Characteristics of a user identifier may include webpages visited by the user identifier, advertisements selected by the user identifier, and/or advertisements selected by the user identifier that led to a conversion. In general, a conversion refers to the performance of a certain action. Typically, the action is the purchase of a good or service. For example, a selected advertisement that led to a conversion may be an advertisement that diverted a client device to a website at which a purchase was made. Other examples of conversions include creating a user profile on a website, subscribing to receive marketing offers (e.g., by providing a postal or email address, by providing a telephone number, etc.), or downloading software from a website.

In some implementations, characteristics of user identifiers may be normalized by utilizing a term-frequency inverse document frequency (TF-IDF) count. Webpages visited by a user identifier may be represented by their uniform resource location (URL) or similar addresses. A selected advertisement may be an advertisement embedded into a webpage, a game, a pop-up advertisement, a banner advertisement, or the like.

In some implementations, content selection server 104 may aggregate feature vectors to find a set of characteristics based on a statistical measurement of the aggregated characteristics. For example, the aggregated characteristics may be the number of times a webpage was visited by the set of user identifiers, the number of times an advertisement or group of advertisements was selected, and/or the number of times an advertisement or group of advertisements led to a conversion. In various implementations, a statistical measurement of the aggregated characteristics may be the average, median, centroid, or other statistical measure of the aggregated characteristics. In one implementation, the aggregated characteristics having the highest amount of activity may be selected (e.g., the top five most visited webpages, the top ten selected advertisements, etc.).

A received set of user identifiers may be subdivided by content selection server 104 into clusters to generate the behavioral model, in one implementation. In some cases, different groups of user identifiers may be associated with the same event and may be associated with widely different interests and motivations. For example, a roll of copper tubing may be purchased from an online hardware store both by plumbers and by hobbyists that homebrew beer. In such a case, the online histories for these two groups may widely differ. For example, the short-term histories of the plumbers may include a number of webpages devoted to making a certain type of plumbing repair. Likewise, the short-term histories of the hobbyists may include a number of webpages devoted to do-it-yourself projects to make a heat sink using copper tubing. Using clustering allows for the different groups of user identifiers to be treated separately in the behavioral model.

In some implementations, feature vectors may be subdivided into clusters by computing a weighted nearest-neighbor list for each user identifier in the set of user identifiers that content selection server 104 uses to train the behavioral model. For example, the feature vectors may be analyzed by content selection server 104 to determine which vectors are closest to one another. In one implementation, the nearest-neighbor list for the received set of user identifiers may be determined by applying a k-nearest-neighbor (KNN) algorithm, or similar algorithm, to the feature vectors. For example, webpages visited by plumbers may be used to form one cluster, while webpages visited by home brewing hobbyists may be used to form a second cluster, based on their nearest neighbors.

In some implementations, content selection server 104 may calculate a similarity score for the user identifier associated with client 102 based on how similar the characteristics of the user identifier are to those of one or more user identifiers specified by an auction participant (e.g., an advertiser or other content provider). For example, an advertiser may send a request to content selection server 104 to identify a user identifier similar to one or more user identifiers specified by the advertiser. Content selection server 104 may determine whether the user identifier associated with client 102 is a similar user identifier and generate a similarity score for the user identifier. In some implementations, content selection server 104 may automatically generate a bid for the advertiser or other content provider, in response to content selection server 104 receiving content request 208 from client 102. For example, if the user identifier of client 102 is determined to be similar to user identifiers specified by an advertiser, content selection server 104 may generate a bid in the auction on behalf of the advertiser. In one implementation, the bid may be determined by content selection server 104 based in part on the similarity score for the user identifier associated with client 102. Based on the results of the auction, content selection server 104 may select content 212 and return the content to client 102 or return an instruction to client 102 configured to cause client 102 to retrieve content from another source.

Figure 3:
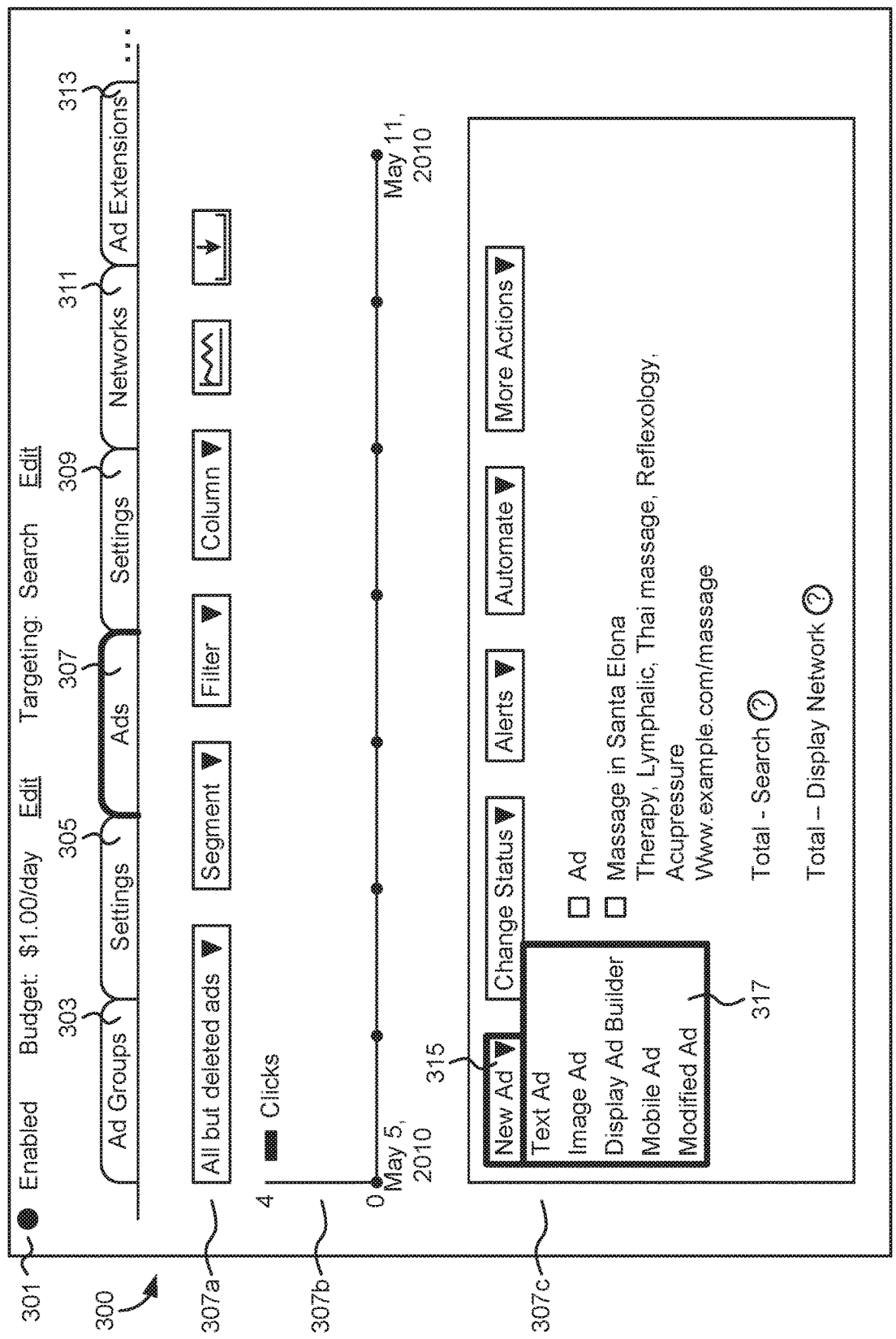
FIG. 3 is an example of an illustration of an interface in accordance with a described implementation.

FIG. 3 is an example of an illustration of interface 300 in accordance with a described implementation.

Interface 300 may be an interface for a content provider to select from among content to configure. In a brief overview, interface 300 may include header 301 to allow the content provider to view content that has been enabled, the budget of the content, the targeting of the content, and/or links to edit the content, etc. Interface 300 may also include an ad groups tab 301 to enable the content provider, for example, to select which advertisement group to modify, edit, view, etc. Interface 300 may also include settings tab 305 to enable the content provider, for example, to modify the settings of the provided content, such as locations, languages, campaign name, budget, etc. Interface 300 may also include advertisement tab 307 to enable the content provider, for example, to modify, monitor, view, etc. content, such as an advertisement. Interface 300 may also include keyword tabs 309 to allow the content provider to add, edit, modify, etc. keywords associated with the content. Interface 300 may also include networks tab 311 to enable the content provider, for example, to select where to display the content, such as a display network. Interface 300 may also include ad extensions tab 313 to enable the content provider, for example, to provide additional information along with the content.

As shown in FIG. 3, advertisement tab 307 is shown as selected. Header 307a may include tabs to display all specific ads, ads based on time, device, network, etc., create a filter, such as CTR>x %, customize columns (e.g., by attributes, performance, etc.), change graph options (e.g., metrics to compare), or download/schedule a report. In other implementations, header 307a may include fewer or less tabs. Advertisement tab 307 may also include graph 307b. Graph 307b may include various performance metrics graphed over various intervals of time.

Header 307c may include tabs configured to add an advertisement, to change status of the advertisement (e.g., enable, pause, delete, etc.), to enable alerts (e.g., allows the content provider to track changes that may be important), to create rules for advertisements, keywords, ad groups, etc. (e.g., pause ads when x occurs, enable keywords when x occurs, etc.), and additional actions. Header 307c may include fewer or less tabs.

As shown in FIG. 3, tab 315, configured to add an advertisement, is illustrated as having been selected. Tab 315 enables the content provider, for example, to add a text ad or an image ad, a mobile ad, a modified ad 317, or to display an advertisement builder (e.g., a tool to help a content provider configure an advertisement).

Modified advertisement 317 may be selected by the content provider. This selection gives the content provider the option to add an advertisement that is modified from an advertisement already configured by the content provider. For example, the content provider may select this option to modify an advertisement with a different message for a returning visitor to the search results, the web page, etc.

Figure 4:
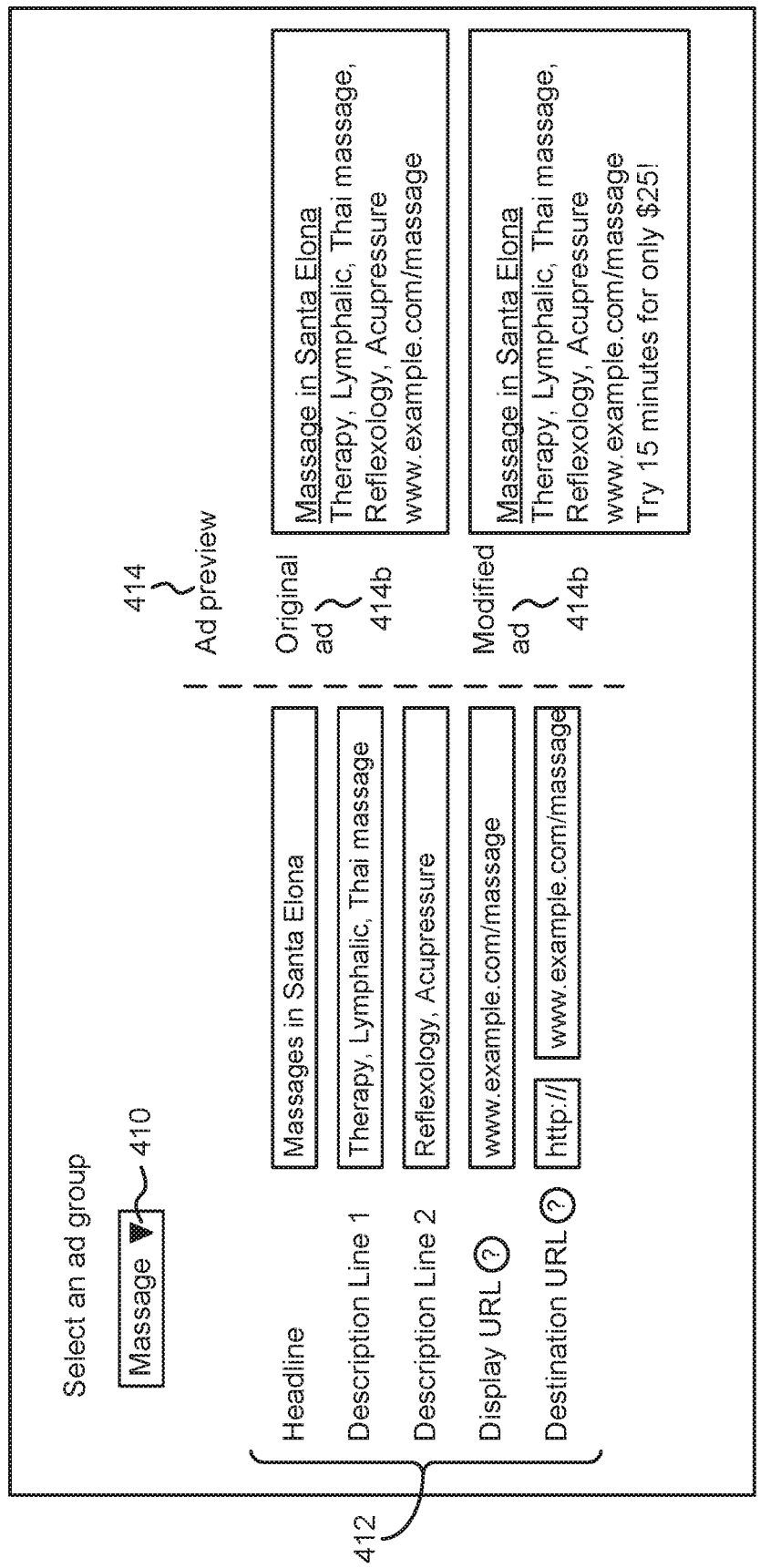
FIG. 4 is an example of an illustration of an interface for a content provider to configure and preview the modified advertisement in accordance with a described implementation.

FIG. 4 is an example of an illustration of an interface 400 for a content provider to configure and preview the modified advertisement in accordance with a described implementation. Interface 400 may include portion 410 for selecting which advertisement group to modify. For example, in FIG. 4, the content provider may select the "massage" advertisement group.

Portion 412 may be filled out by the content provider at interface 400 or pre-filled (e.g., automatically configured) using a previously configured advertisement. Preview pane 414 may display original ad 414a and modified ad 414b. Preview pane 414 may also show the ad as a side ad, as shown in FIG. 4, a top ad, or another appropriate configuration.

Figure 5:
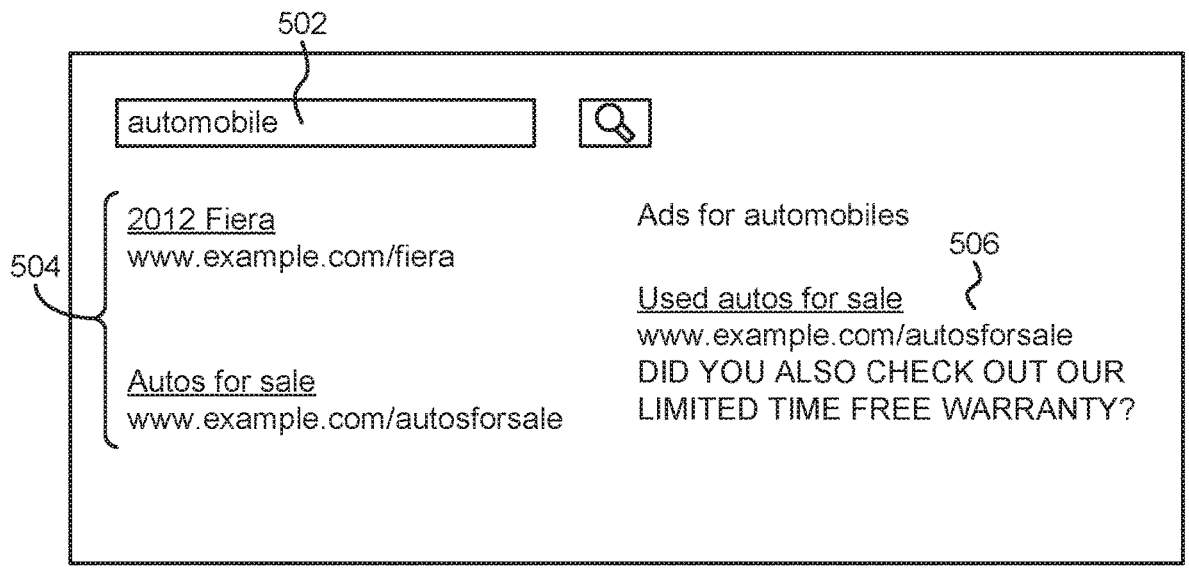
FIG. 5 also shows an example of an advertisement, in accordance with a described implementation.

FIG. 5 is an example of an illustration 500 of a search query in accordance with a described implementation. Search query 502 may be entered at a search engine using a keyword, e.g., "automobiles," an image, an audio command, etc. Search query 502 may be entered into a search field on a web page, as illustrated by FIG. 5. The search engine may perform a search of its index and provide search results 504. Search results 504 may include a set of documents, where each document indicates a URL, along with a link to the page, and a snippet of text to display context to the document to the user. Documents may include any type of media that may be indexed and/or retrieved by a search engine, including, but not limited to, web pages, images, text documents, multimedia files, PDFs, etc.

The search engine may also provide a request for advertisement 506. The request may depend on the search results. The request may include a number of advertisements, the amount of screen or page space occupied by search results 504, the size and shape of the advertisements, etc. The request provided by the search engine may also include the query, information based on the query, information associated with, or based on, the search results, etc. The information may include identifiers related to the search results (e.g., document identifiers), text extracted from a document, topics, etc.

The search engine may combine search results 504 with advertisement 506 provided by content selection server 104. The combined information may be provided for presentation to the user that submitted the search query. In FIG. 5, search results 504 are maintained as distinct from advertisement 506 to not confuse the user between advertisement 506 and search results 504.

FIG. 5 also shows an example of advertisement 506, which is shown as a modified advertisement. Advertisement 506 has been modified to include language "Did you also check out our limited time free warranty?" This language may be annotated to advertisement 506 based on the user returning to search results 504 from another advertisement, another web page, etc.

Figure 6:
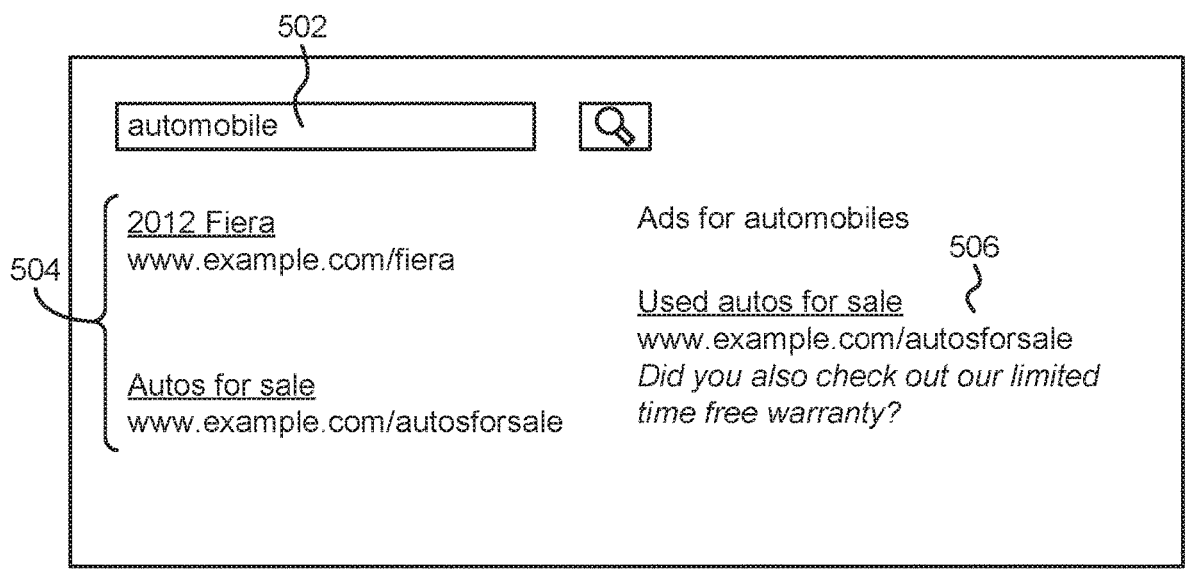
FIG. 6 is an example of a modified advertisement in accordance with a described implementation.
Figure 7:
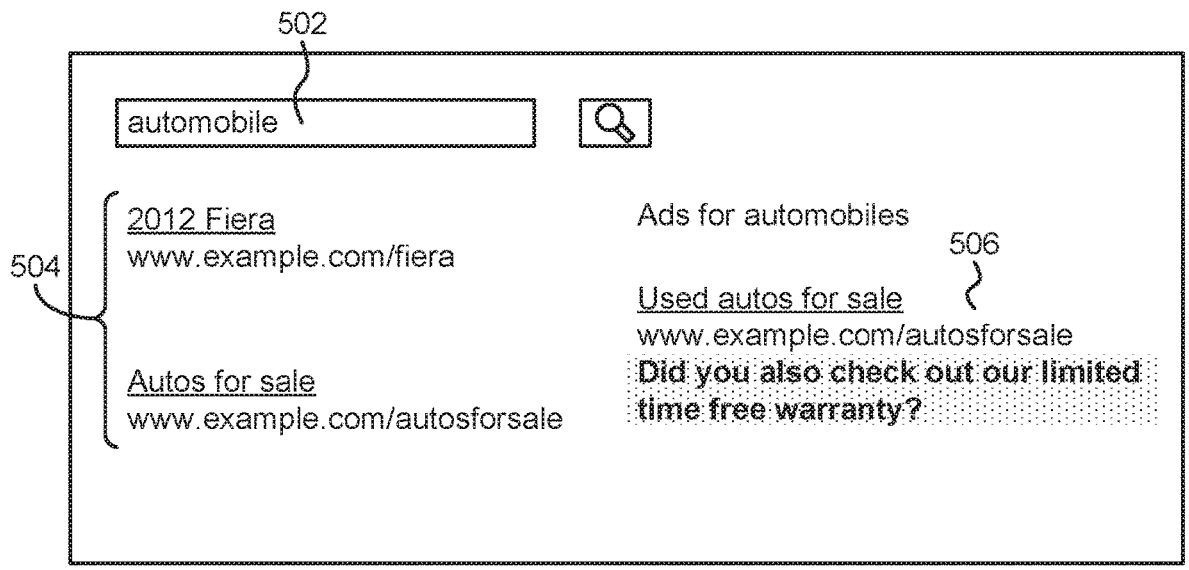
FIG. 7 is an example of a modified advertisement in accordance with a described implementation.
Figure 8:
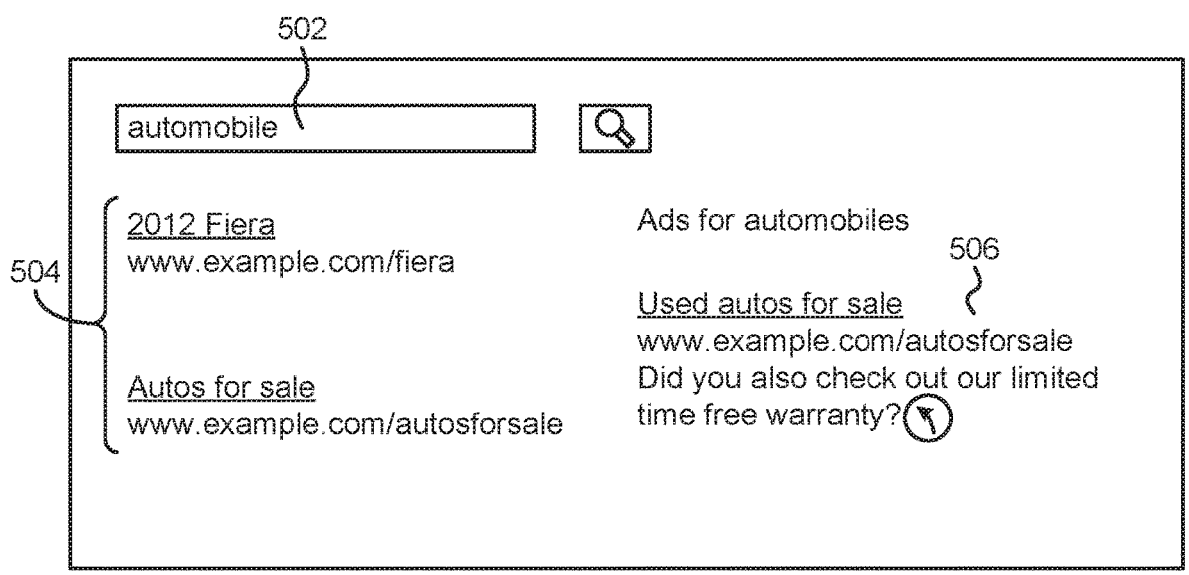
FIG. 8 is an example of a modified advertisement in accordance with a described implementation.

FIGS. 6-8 are also examples of advertisement 506 being modified for a return visitor. For example, in FIG. 6, the modified language of advertisement 506 is italicized. In FIG. 7, the modified language of the advertisement is bolded. In FIG. 8, the modified language of advertisement 506 has an icon alongside it. In other implementations, the content provider or the system may provide any text, image, graphic, etc. to distinguish the modified advertisement from an advertisement that is not modified (e.g., an initially viewed advertisement.) Each of the modifications in FIGS. 6-8 may be previewed prior to display, such as by the preview pane as described in FIG. 4.

Figure 9:
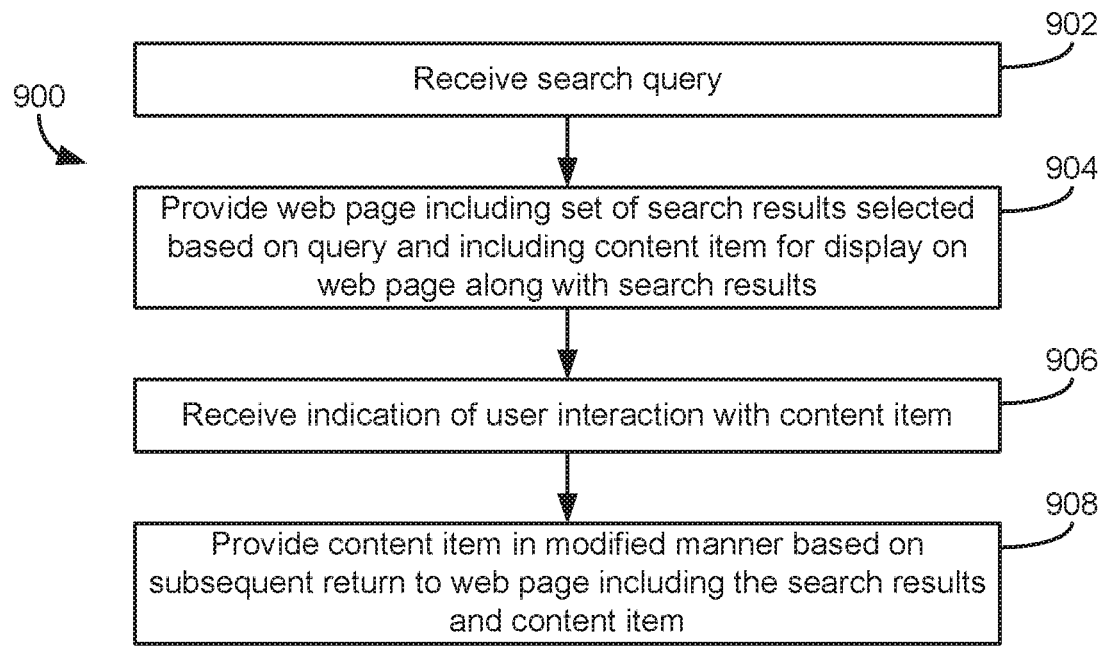
FIG. 9 is an example of a flow diagram in accordance with a described implementation.

FIG. 9 is an example of an illustration of a flow diagram of a method for generating content associated with search results. Method 900 may be performed by various systems and components. Method 900 may be performed online or offline.

At block 902, a search query is received. In some implementations, the search query is received from a user, visitor, etc. The search query may be text, audio, an image, etc. The search query may be a phrase entered into an input field. One or more terms, phrases, etc. may be accepted from the search query. In some implementations, the search query may be received by a web browser. Additional information may be provided with the search query (or in the alternative), e.g., information related to the content of the page as well as a content item request. Multiple interpretations, associations, etc. may be generated for the search query. Each of these interpretations, associations, etc. may be explored, e.g., by a parsing algorithm. The most relevant interpretation may be selected and returned as part of the search results provided to the user. In some implementations, another step or steps may be performed for each term, phrase, etc.

At block 904, a web page including a set of search results selected based on the query may be provided. In some implementations, the web page may include a content item for display on the web page alongside the search results. The content item may be selected based on the search query. For example, the keyword of the search query may be provided to a content auction, where the relevant content item wins the auction based on the relevance of the search query keyword. The content item may include at least one of text, image, interactive, rich media, and video data.

At block 906, an indication of a user interaction with the content item may be received. For example, the user may select the content item and be taken to the web page associated with that content item.

At block 908, based on a subsequent return to the web page including the search results and the content item, the content item is provided in a modified manner. In some implementations, the modified manner may include the modification of a format of the content item to distinguish the content item from the set of search results and other content items. The modified content item may include a discount from the displayed content item on the web page, e.g., a better deal may be offered to the return visitor. In other implementations, the modified content item may include a promotional offer, e.g., an additional product or service.

In some implementations, the subsequent return to the search results may occur during a search session. The subsequent return to the search results may be denoted by a back button of a web browser. The search session may include an interval of time between search queries. In some implementations, the search session may include an interval of time that is indicated by logging into or out of a search engine interface. In some implementations, the search session includes a relationship between a newly received search query and previously received search queries.

Method 900 may also include determining whether a portion of the web page comprising information from the content item has been viewed, and, if not, providing the modified content item along with the search results.

Implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
   a tangible computer-readable storage device storing instructions; and
   one or more processors configured to execute the instructions to:
   receive an acoustic query from a device;
   provide, to the device, (i) a set of results selected based on the acoustic query and (ii) an initial version of a content item for display along with the set of results, the initial version of the content item comprising a first presentation text;
   detect a request from the device to return to the set of results during a search session;
   create, responsive to detection the request from the device to return to the set of results during the search session, a modified version of the content item comprising one or more same visual elements as the initial version of the content item and one or more different visual elements modified from the initial version of the content item, the one or more different visual elements including a second presentation text different from the first presentation text, the initial version and the modified version of the content item configured to link to a same destination address; and
   provide, responsive to detection the request from the device to return to the set of results during the search session, (i) the set of results selected based on the acoustic query and (ii) the modified version of the content item for display along with the set of results.

2. The system of claim 1, wherein the modified version of the content item includes audio content.

3. The system of claim 1, wherein the initial version of the content item includes audio content.

4. The system of claim 1, wherein the set of results include audio content.

5. The system of claim 1, comprising:
   the one or more processors configured to provide the set of results including audio content for display by the device, the device including a mobile audio player or a mobile video player.

6. The system of claim 1, comprising:
the one or more processors configured to provide the set of results including audio content for display by the device, the device including a mobile video player.

7. The system of claim 1, comprising:
the one or more processors configured to execute the instructions to detect the request from the device to return to the set of results based on a device identifier that represents the device during the search session.

8. The system of claim 1, wherein the initial version of the content item comprises an initial format for the first presentation text and the second version of the modified version of the content item comprises a modified version of the format applied to the second presentation text.

9. The system of claim 1, comprising:
the one or more processors configured to execute the instructions to create the modified version of the content item responsive to receipt of an indication of an interaction with the content item on the device.

10. The system of claim 1, comprising:
the search session having a duration from a search engine login to a subsequent search engine logout via a search engine interface.

11. The system of claim 1, comprising:
the search session having a duration from the acoustic query from the device to a second query from the device.

12. The system of claim 1, wherein the modified version of the content item comprises an image not included in the initial version of the content item.

13. A method, comprising:
receiving, at a server, an audio query from a device;
providing, to the device, (i) a set of results selected based on the audio query and (ii) an initial version of a content item for display along with the results, the initial version of the content item comprising a first presentation text;
detecting a request from the device to return to the set of results during a search session;
creating, responsive to detecting the request from the device to return to the set of results during the search session, a modified version of the content item comprising one or more same visual elements as the initial version of the content item and one or more different visual elements modified from the initial version of the content item, the one or more different visual elements including a second presentation text different from the first presentation text, the initial version and the modified version of the content item configured to link to a same destination address; and
providing, responsive to detecting the request from the device to return to the search results during the search session, (i) the set of results selected based on the audio query and (ii) the modified version of the content item for display along with the results.

14. The method of claim 13, wherein the modified version of the content item includes audio content.

15. The method of claim 13, wherein the initial version of the content item includes audio content.

16. The method of claim 13, wherein the set of results include audio content.

17. The method of claim 13, comprising:
providing the set of results including audio content for display by the device, the device including a mobile audio player or a mobile video player.

18. The method of claim 13, comprising:
providing the set of results including audio content for display by the device, the device including a mobile video player.

19. A system, comprising:
a tangible computer-readable storage device storing instructions; and
one or more processors configured to execute the instructions to:
transmit an acoustic query to a device;
receive, from the device, (i) a set of results selected based on the acoustic query and (ii) an initial version of a content item for display along with the results, the initial version of the content item comprising a first presentation text;
display (i) the set of results selected based on the acoustic query and (ii) the initial version of the content item;
transmit a request to the device to return to the set of results during a search session;
receive, from the device, (i) the set of results selected based on the acoustic query and (ii) a modified version of the content item for display along with the results, the modified version of the content item created by the device, responsive to receiving the request to return to the set of results during the search session, the modified version of the content item comprising one or more same visual elements as the initial version of the content item and one or more different visual elements modified from the initial version of the content item, the one or more different visual elements including a second presentation text different from the first presentation text, the initial version and the modified version of the content item configured to link to a same destination address; and
display (i) the set of results selected based on the acoustic query and (ii) the modified version of the content item for display along with the results.

20. The system of claim 19, wherein the set of results include audio content.

* * * * *